United States Patent [19]
Pavel

[11] 3,935,696
[45] Feb. 3, 1976

[54] AGRICULTURAL TOOL BAR

[76] Inventor: Raymond Pavel, Scotland, S. Dak. 57039

[22] Filed: May 16, 1974

[21] Appl. No.: 470,390

[52] U.S. Cl. .................................................. 56/385
[51] Int. Cl.² ........................................ A01D 76/00
[58] Field of Search ............................... 56/228, 385

[56] References Cited
UNITED STATES PATENTS 3,173,497   3/1965   French ................................. 56/385

Primary Examiner—Louis G. Mancene
Assistant Examiner—Robert F. Cutting
Attorney, Agent, or Firm—Zarley, McKee, Thomte, Voorhees & Sease

[57] ABSTRACT

An agricultural tool bar particularly well suited for use as a hay rake or the like is disclosed which may be quickly and easily moved between transport and working positions with a minimum of effort. The tool bar comprises a wheeled frame which is secured to the draw bar of the tractor and which has wheeled wing frames pivotally secured to the outer ends thereof. Each of the frames carries a pivotal tool support or bar thereon which are interconnected and which may be pivotally moved to raise and lower the tool secured thereto. Each of the wing frames carries a selectively pivotal wheel which may be locked in working or transport positions. Locking means is provided between the outer ends of the central frame and the wing frames to lock the wing frames in their working position.

11 Claims, 12 Drawing Figures

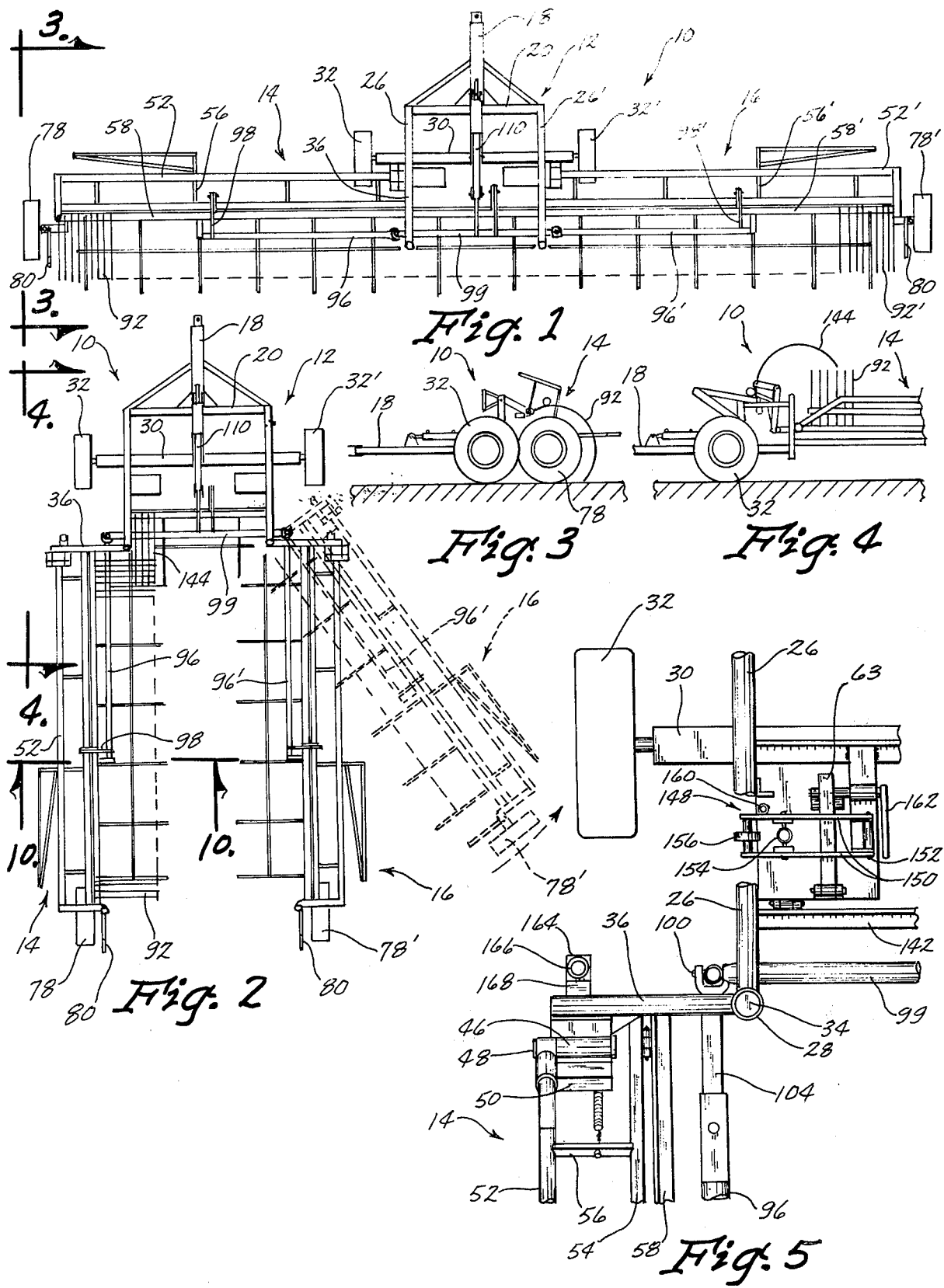

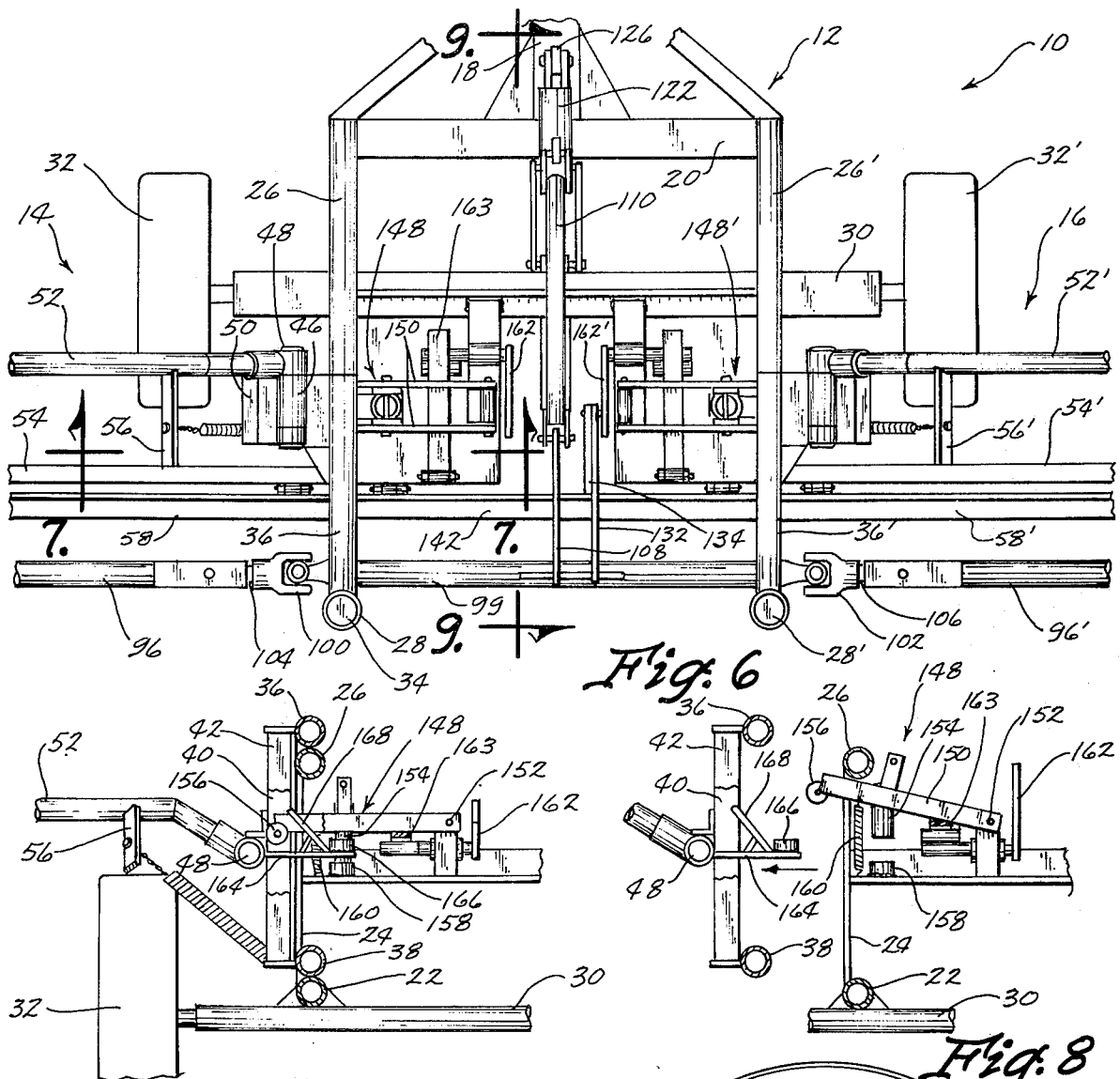
Fig. 6
Fig. 7
Fig. 8
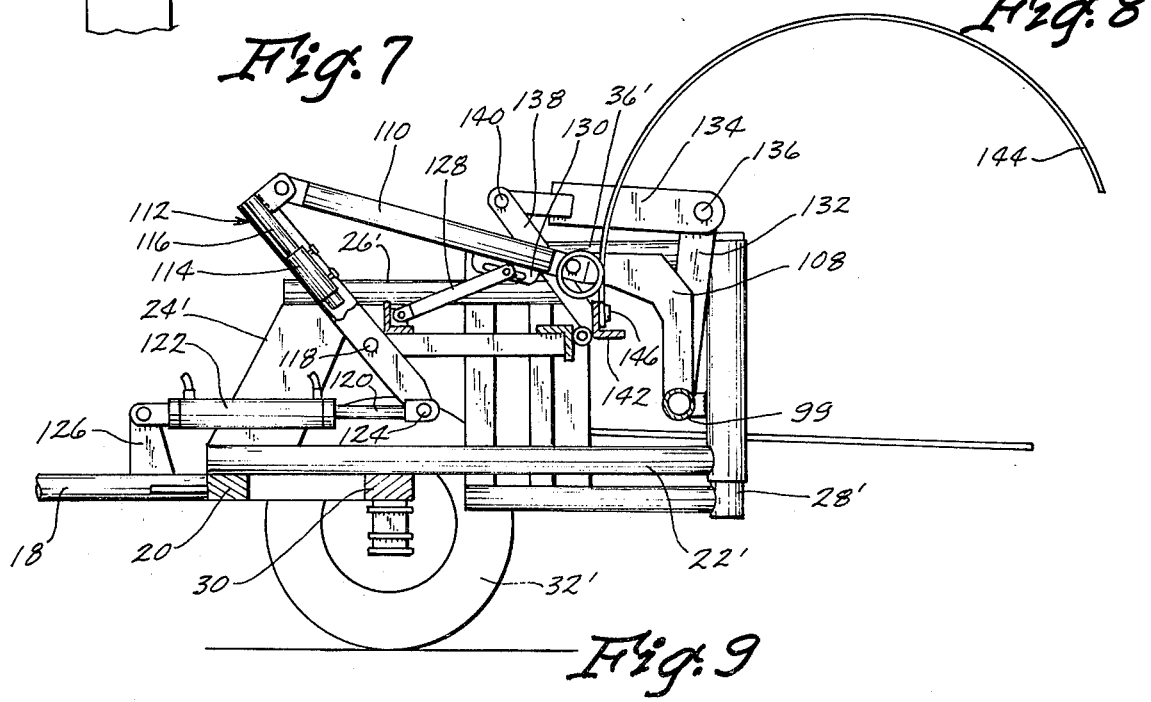
Fig. 9

AGRICULTURAL TOOL BAR

BACKGROUND OF THE INVENTION

This invention relates to an agricultural tool bar and more particularly to an agricultural tool bar which may be used as a hay rake or the like. Modern agricultural tool bars such as hay rakes are extremely wide which makes it necessary to provide some means of transporting the same from one location to another location in a position other than the transverse working position. Conventional hay rakes or the like are sometimes difficult to move between their working and transport positions and vice versa.

Therefore, it is a principal object of the invention to provide an improved agricultural tool bar.

A further object of the invention is to provide an agricultural tool bar especially well suited for use as a hay rake.

A further object of the invention is to provide an agricultural tool bar which may be easily moved from a working position to a generally U-shaped transport position.

A further object of the invention is to provide an agricultural tool bar including means for pivotally moving the tool support bar mounted thereon.

A further object of the invention is to provide an agricultural tool bar having means thereon which automatically locks the tool bar in its working position as it is being moved from its transport position to its working position.

A further object of the invention is to provide an agricultural tool bar ideally suited for use as a hay rake and which includes means for raising the rake tines on the central frame into a position so that the rake tines on the wing members may move therebeneath when the apparatus is moved to its transport position.

A further object of the invention is to provide an agricultural tool bar which is durable in use and easy to operate.

These and other objects will be apparent to those skilled in the art.

BRIEF DESCRIPTION OF THE DRAWINGS

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a top plan view of the tool bar positioned in its working position;

FIG. 2 is a top plan view of the tool bar in its transport position with the broken lines portraying the manner in which one of the wing frames is moved to its working position;

FIG. 3 is a view of the apparatus as seen on lines 3—3 of FIG. 1;

FIG. 4 is a view of the apparatus as seen on lines 4—4 of FIG. 2;

FIG. 5 is a partial top plan view of the apparatus illustrating the relationship between one end of the central frame and the inner end one of the wing frames;

FIG. 6 is a partial top plan view of the central portion of the invention;

FIG. 7 is a sectional view seen on lines 7—7 of FIG. 6: 6;

FIG. 8 is a sectional view similar to that of FIG. 7 except that the wing frame is pivotally moving outwardly with respect to the center frame;

FIG. 9 is a sectional view seen on lines 9—9 of FIG. 6 with portions thereof cut-away to more fully illustrate the invention;

DESCRIPTION OF THE PREFERRED EMBODIMENT

Figure 10:
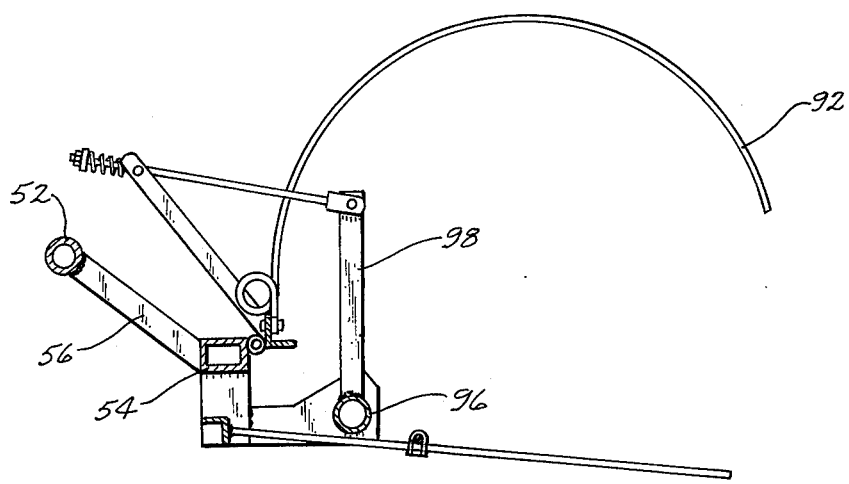
FIG. 10 is an enlarged sectional view as seen on lines 10—10 of FIG. 2.

In the drawings, the agricultural tool bar of this invention is in the form of a hay rake generally designated by the reference numeral 10. While the drawings illustrate a hay rake, it should be understood that the invention could be used for other agricultural purposes other than for raking hay. Rake 10 generally includes a central frame 12 having wing frames 14 and 16 selectively pivotally secured thereto so that the rake 10 may be moved from the working position illustrated in FIG. 1 to the transport illustrated in FIG. 2.

Central frame 12 generally comprises a tongue 18 secured at its rearward end to a transversely extending brace 20. Pipe 22 is secured at its forward end to brace 20 and extends rearwardly therefrom. Plate 24 is welded to the forward end of pipe 22 and extends upwardly and rearwardly therefrom and has pipe 26 welded thereto as seen in the drawings. Pipes 22 and 26 are disposed in a parallel relationship and have pipe 28 welded to the rearward ends thereof. A pipe 22' is welded to the other end of brace 20 and extends rearwardly therefrom in an identical manner to pipe 22. Plate 24' is welded to the forward end of pipe 22' and extends upwardly and rearwardly therefrom. The forward end of pipe 26' is secured to the upper end of plate 24' and extends rearwardly therefrom. Pipe 28' is welded to the rearward ends of pipes 22' and 26' as illustrated in FIG. 9. Axle support 30 is welded to pipes 22 and 22' and extends transversely with respect to the direction of travel of the tractor. Wheels 32 and 32' are operatively rotatably connected to the axle support 30 in conventional fashion.

Wing frame 14 includes a pipe 34 which is rotatably mounted on pipe 28 and which has pipes 36 and 38 welded to the upper and lower ends thereof which extend transversely therefrom. Spaced apart posts 40 and 42 are secured to pipes 36 and 38 adjacent the forward ends thereof and extend therebetween in a substantially vertically disposed and horizontally spaced relationship. Pipe stub 46 is welded to the posts 40 and 42 and has a shaft 48 rotatably mounted therein about a horizontal axis. Support 50 is secured to the rearward and forward ends of the shaft 48 for movement therewith. The inner ends of support frame members 52 and 54 are operatively secured to the support 50 and extend outwardly therefrom. Support frame members 52 and 54 are interconnected along their length by a plurality of bars 56 welded thereto. Tool bar support 58 is pivotally connected about a horizontal axis to the support frame member 54 along the length thereof.

Figure 11:
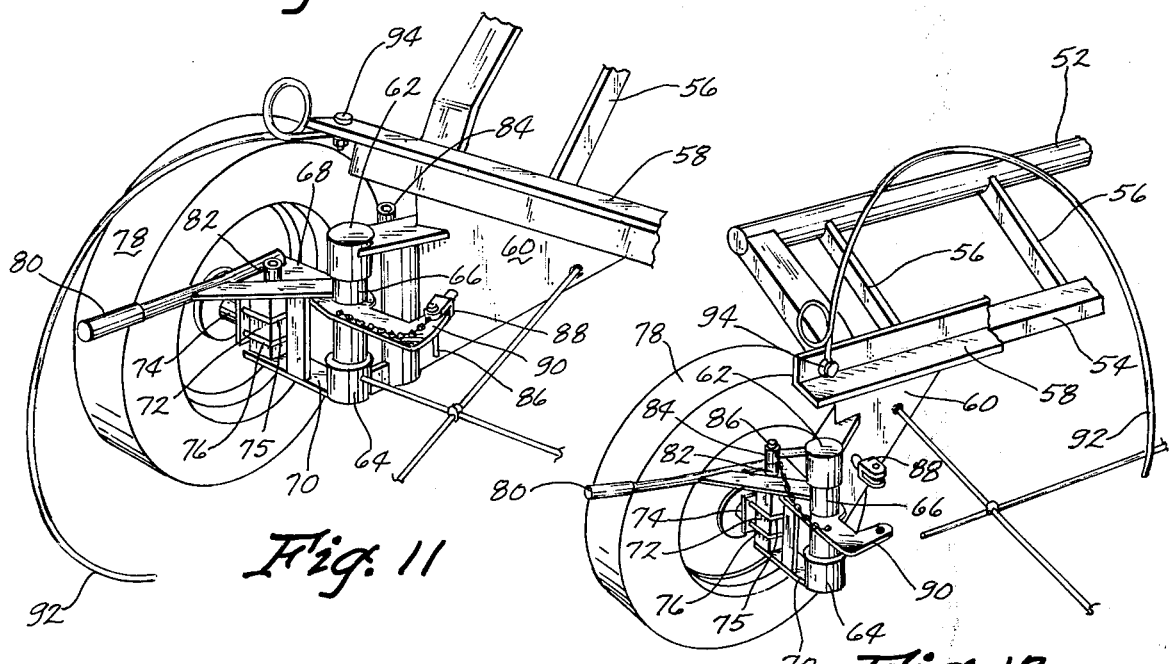
FIG. 11 is a partial rear perspective view of the wheel locking mechanism at the outer end of one of the wing frames.
Figure 12:
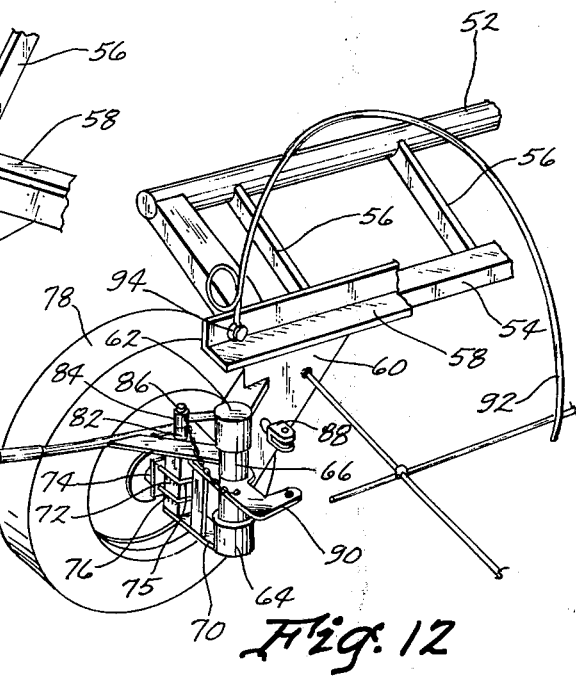
FIG. 12 is a view similar to that in FIG. 11 except that the wheel has been pivotally moved from its working position to a transport position.

Plate 60 is secured to the outer end of support frame member 54 and has a pair of spaced apart pipe caps 62 and 64 secured thereto as seen in FIG. 11. Shaft 66 has its upper and lower ends rotatably mounted in pipe caps 62 and 64 and has a pair of horizontally spaced bars 68 and 70 welded thereto which extend outwardly therefrom. Post 72 is welded to the outer ends of bars 68 and 70 and has axle 74 selectively vertically adjustably secured thereto by means of U-bolts 75 and 76. Wheel 78 is rotatably mounted on the axle 74 in conventional fashion. Handle 80 is welded to the outer end of bar 68 as illustrated in FIG. 11 to permit the wheel 78 to be pivotally moved between the positions of FIGS. 11 and 12. Tube 82 is welded to bar 68 and is adapted to register with the tube 84 operatively secured to the plate 60 when the wheel 78 has been pivotally moved to the transport position illustrated in FIG. 12. Pin 86 may be inserted through the registering tubes 82 and 84 to lock the wheel in the transport position as illustrated in FIG. 11. As seen in FIGS. 11 and 12, bracket 88 is welded to plate 60 and is adapted to receive the forward end of bar 90 which is secured to the shaft 66. Bar 90 and bracket 88 have registering openings adapted to receive the pin 86 therein to permit the wheel 78 to be locked in the working position illustrated in FIG. 11. The numeral 92 refers to tine members which are secured to the tool support 58 by means of bolts 94.

Inasmuch as the structure on wing frame 16 is identical to that described on wing frame 14, only wing frame 14 will be described in detail with "'" indicating identical structure on wing frame 16.

The numeral 96 refers to a shaft suitably rotatably mounted on wing frame 14 and having a spring loaded actuating arm 98 secured thereto which is connected to the tool support bar 58 in the manner illustrated in FIG. 10 to cause the tine members 92 to pivotally move from the position illustrated in FIG. 11 to the position illustrated in FIG. 10 and vice versa. The numeral 99 refers to a shaft which is rotatably mounted on center frame 12 and which has universal joints 100 and 102 provided at its opposite ends. Universal joints 100 and 102 are secured to square shafts 104 and 106 respectively which are telescopically received by the shafts 96 and 96' respectively so that rotation of shaft 99 will cause rotation of shafts 96 and 96'. Actuating arm 108 is welded to shaft 99 and extends upwardly therefrom and thence forwardly. Arm 110 is pivotally connected at its rearward end to the forward end of actuating arm 108 and is pivotally connected at its forward end to a linkage referred to generally by the reference numeral 112. As seen in FIG. 9, linkage 112 includes a sleeve 114 which adjustably receives shaft 116 which is pivotally connected to the arm 110 to permit the "throw" of actuating arm 108 to be selectively altered. Linkage 112 is pivotally connected to the center frame 12 at 118 and is pivotally connected at its lower end to the rod 120 of a hydraulic cylinder 122 at 124. The forward end of cylinder 122 is pivotally connected to bracket 126 which is welded to tongue 18 as illustrated in FIG. 9. The numeral 128 refers to a locking arm which is pivotally connected to the center frame as illustrated in FIG. 9 and which may be selectively secured to bracket 130 mounted on arm 110 as illustrated so as to prevent the lowering of the tine members when the hydraulic cylinder is disconnected from the tractor hydraulic power source. In other words, arm 128 would be disconnected from the bracket 130 until the apparatus is to be transported by means other than the tractor at which time the arm 128 would be secured to the bracket 130 to prevent the rotation of actuating arm 107 and the shaft 99. As illustrated in the drawings, shaft 96' is operatively connected to the tool bar support 58' mounted on wing frame 16. As illustrated in FIG. 9, actuating arm 132 is also secured at its lower end to the shaft 99 and extends upwardly and rearwardly therefrom at an angle differently than the actuating arm 108. The rearward end of linkage 134 is pivotally connected to the upper end of arm 132 at 136 and is pivotally connected at its forward end to an arm 138 at 140. Arm 138 is welded at its lower end to the tool support bar 142 which is pivotally mounted on the center frame 12. Tines 144 are secured to the bar 142 by means of bolts 146.

The numerals 148 and 148' refer to locking means provided on the outer ends of the center frame 12 for locking the wing frames 14 and 16 in the working position illustrated in FIGS. 1 and 6. Inasmuch as locking means 148 and 148' are identical, only locking means 148 will be described in detail with "'" indicating identical structure on locking means 148'. Lever 150 is pivotally connected to center frame 12 at 152 and has a shaft stub 154 secured thereto by welding or the like which extends downwardly therefrom inwardly of its outer end as illustrated in FIGS. 7 and 8. A roller means 156 is rotatably mounted on the outer end of lever 156 as also seen in FIGS. 7 and 8. Collar 158 is welded to the center frame 12 and is adapted to receive the lower end of pipe stub 154 when the lever 150 is moved to the locking position as seen in FIG. 7. Spring 160 is secured to the lever 150 for yieldably resisting the upwardly pivotal movement of the lever 150. The numeral 162 refers generally to a lever actuated eccentric means which may be moved from the position of FIG. 7 to the position of FIG. 8 to pivotally move the lever 150 upwardly due to the engagement of the eccentric or cam means 163 with the under side thereof. Bar 164 is operatively secured to the posts 40 and 42 and extends inwardly therefrom (FIGS. 7 and 8). Collar 166 is mounted on the inner end of bar 164 and is adapted to be positioned over collar 158 when the wing frame 14 is in the working position as shown in FIG. 7. It can be seen in FIGS. 7 and 8 that a locking release arm 168 is provided on the bar 164 to engage the roller 156 and to pivotally move the lever 150 upwardly as the wing frame 14 is moved from its transport position to its working position so that the pipe stub 154 will be moved upwardly relative to collar 158 to permit the collar 166 to be positioned therebetween in an automatic manner.

FIGS. 1, 6, 7 and 11 illustrate the device in the normal operating position. The locking means 148 and 148' are in their locked positions such as illustrated in FIG. 7 so that the wing frames 14 and 16 will extend transversely with respect to the center frame 12. The wheel means 78 and 78' are also locked in their working position as previously described. The hydraulic cylinder 122 may be selectively actuated from the tractor to cause the selective rotation of shaft 99 which causes shafts 96 and 96' to be likewise rotated. Rotation of shafts 96 and 96' cause the rotation of tool bar supports 58 and 58' which in turn pivotally move the tine members 92 and 92'. Rotation of the shaft 99 also causes the arm 132 and linkage 134 to pivotally rotate the tool support bar 142 which causes the movement of the tines 144. Movement of the tines 92, 92' and 144 permits the hay to be raked and dumped in conventional fashion.

When it is desired to move the rake 10 into its transport position, it is simply necessary to actuate the levers 162 and 162' so that the locking means 148 and 148' are unlocked. FIG. 7 illustrates the locking means 148 in its locked position while FIG. 8 illustrates the locking means 148 in its unlocked position.

If not previously accomplished, the hydraulic cylinder 122 would be actuated so as to cause the tine members on the wing frames and center frame to be pivotally moved to their upper position. The relationship of the linkage connecting the tine members 144 to the center frame is such that the tine members 144 are raised to a position higher than the tine members 92 and 92' to permit the tine members 92 and 92' to pass under the tine members 144 when the device is moved to its transport position.

The wheel means 78 and 78' are then unlocked as previously described and the wing frames may be "walked" rearwardly by the operator to the position of FIG. 2. The wheel means 78 and 78' are then locked in their transport position as also previously described. The hay rake may then be easily transported since it has a narrow width as compared to the width of its operating or working position. When it is desired to move the wing frames 14 and 16 back to their operating position, the wheel means 78 and 78' would be unlocked from the position of FIG. 12 as previously discussed. The operator would then operate the levers 162 and 162' so that the levers 150 and 150' are moved to their locked position. The operator then walks each of the wing frames 14 and 16 forwardly from the position of FIG. 2 to the position of FIG. 1. The locking release arm 168 engages the roller 156 to cause the lever 150 to move upwardly so the collar 166 will be positioned beneath the pipe stub 154. As soon as locking release arm 168 disengages from the roller 156, the lever 150 automatically pivots downwardly so that pipe stub 154 extends through the collar 166 and into the collar 158 to positively lock the wing frame in its working position. Wing frame 16 is locked in its working position in an identical manner.

Thus it can be seen that a unique agricultural tool bar has been provided which may be quickly and easily moved from a transport position to a working position and vice versa in an efficient manner with a minimum of effort. Thus it can be seen that the device accomplishes at least all of its stated objectives.

I claim:

1. An agricultural tool bar comprising,
a wheeled center frame having rearward and forward ends and opposite sides,
first and second wing frames each having rearward, forward, inner and outer ends,
said first wing frame being selectively pivotally secured at its inner end, about a vertical axis, to one side of said center frame,
said second wing frame being selectively pivotally secured at its inner end, about a vertical axis, to the other said of said center frame,
said first and second wing frames being selectively pivotally movable between working and transport positions relative to the direction of travel of the tool bar,
locking means for selectively locking said wing frames in their said working position,
a rotatable wheel pivotally mounted on each of said wing frames and being pivotally movable between working and transport positions,
a tool support bar movably mounted on each of said center frame, said first wing frame and said second wing frame,
and means for moving said tool support bars relative to said center frame, said first wing frame and said second wing frame.

2. The tool bar of claim 1 wherein said locking means includes mechanism for automatically locking each of said wing frames in their working positions as they are being moved from their transport position to their working position.

3. The tool bar of claim 1 wherein wheel locking means is provided on each of said wing frames for selectively locking said rotatable wheels thereon in said working and transport positions.

4. The tool bar of claim 1 wherein said tool support bars are pivotally mounted, about horizontal axes, on said frame and wherein said means for moving tool support bars comprises a first shaft rotatably mounted on said center frame about a horizontal axis parallel to the tool support bar thereon, a first linkage pivotally interconnecting said first shaft and said tool support bar on said center frame, a power cylinder on said center frame, a second linkage interconnecting said power cylinder and first shaft whereby operation of said power cylinder causes said second linkage to rotate said first shaft which causes said first linkage to pivotally move said tool support bar on said center frame and interconnection mechanism interconnecting said first shaft and said tool support bars on said first and second wing frames.

5. The tool bar of claim 4 wherein said interconnection mechanism comprises a rotatable shaft mounted on each of said wing frames which are connected to the ends of said first shaft, and pivotal linkage interconnecting the rotatable shafts on said wing frames with the tool support bar thereon.

6. The tool bar of claim 5 wherein a universal joint is mounted on each end of said first shafts, each of said universal joints being operatively telescopically secured to the rotatable shaft on the wing frame adjacent thereto.

7. The tool bar of claim 5 wherein tine members are secured to each of said tool support bars, said first and second linkages being disposed relative to each other so that the tool support bar on said center frame is pivotally moved a greater amount than the tool support bars on said wing frames.

8. The tool bar of claim 1 wherein a pair of said locking means is provided for locking said wing frames in their working positions, each of said locking means comprising a first vertically disposed stub mounted on said center frame; a first lever pivotally mounted on said center frame and having a locking pipe secured thereto and extending downwardly therefrom adapted to have its lower end received by said pipe stub when in a locked position; a collar mounted on said wing frame and being positioned above said pipe stub when said wing frame is in its working position; said locking pipe adapted to extend downwardly through said collar to lock said wing frame in its working position when said first lever is in its locked position.

9. The tool bar of claim 8 comprising a manually operated cam mechanism for moving said lever upwardly from its locked position to its unlocked position.

10. The tool bar of claim 8 wherein a lever actuator is secured to the wing frame for engagement with said first lever as said wing frame is moved to its working position to pivotally move said first lever upwardly to permit said collar to be positioned between said locking pipe and said pipe stub.

11. The tool bar of claim 10 wherein said lever actuator disengages from said locking pipe to move downwardly through said collar and into said pipe stub when said wing frame reaches its working position.

* * * * *